United States Patent
Coatantiec et al.

(10) Patent No.: US 7,409,289 B2
(45) Date of Patent: Aug. 5, 2008

(54) DEVICE FOR MONITORING THE INTEGRITY OF INFORMATION DELIVERED BY A HYBRID INS/GNSS SYSTEM

(75) Inventors: Jacques Coatantiec, Fauconnieres (FR); Bertrand Lesot, Valence (FR)

(73) Assignee: Thales (FR)

( * ) Notice: Subject to any disclaimer, the term of this patent is extended or adjusted under 35 U.S.C. 154(b) by 212 days.

(21) Appl. No.: 10/586,371

(22) PCT Filed: Jan. 31, 2005

(86) PCT No.: PCT/EP2005/050390
§ 371 (c)(1),
(2), (4) Date: Jul. 18, 2006

(87) PCT Pub. No.: WO2005/088337
PCT Pub. Date: Sep. 22, 2005

(65) Prior Publication Data
US 2007/0156338 A1     Jul. 5, 2007

(30) Foreign Application Priority Data
Feb. 13, 2004   (FR) .................................. 04 01476

(51) Int. Cl.
*H04B 7/19* (2006.01)
*G01S 5/14* (2006.01)
(52) U.S. Cl. .................. 701/214; 701/216; 342/357.14
(58) Field of Classification Search .................. 701/214
See application file for complete search history.

(56) References Cited

U.S. PATENT DOCUMENTS 5,583,774 A * 12/1996 Diesel ........................ 701/200

(Continued)

FOREIGN PATENT DOCUMENTS

EP      1205732 A2 *  5/2002

(Continued)

OTHER PUBLICATIONS

Call. Performance of Honeywell's Inertial/GPS Hybrid (HIGH) for RNP Operations. IEEE.*

(Continued)

*Primary Examiner*—Thomas G. Black
*Assistant Examiner*—Shelley Chen
(74) *Attorney, Agent, or Firm*—Lowe Hauptman Ham & Berner, LLP (57) ABSTRACT

The device is for monitoring the integrity of the position and speed information supplied by a hybrid system comprising an inertial unit INS readjusted using a GNSS satellite positioning receiver by means of a Kalman hybridization filter using a readjustment gain K and an evolution matrix F. It includes a satellite problem-detector circuit comprising a bank of predictor/estimator filters which uses the gain K and the evolution matrix F of the Kalman hybridization filter, each filter observing the deviation between the positioning point obtained from the N visible satellites, in the form of geographic coordinates, delivered by the GNSS receiver and one of the positioning points $P_{(N-1)/i}$, also in the form of geographic coordinates, delivered by this same GNSS receiver, obtained by using N−1 of the N visible satellites for resolution, and test circuits comparing the states of the predictor/estimator filters with their variances and detecting a satellite failure when a test is positive, the deviation found being greater than a detection threshold.

10 Claims, 5 Drawing Sheets

U.S. PATENT DOCUMENTS

| | | | | |
|---|---|---|---|---|
| 5,760,737 | A * | 6/1998 | Brenner | 342/357.02 |
| 6,134,484 | A * | 10/2000 | Geier et al. | 701/13 |
| 6,298,316 | B1 * | 10/2001 | Diesel | 702/190 |
| 6,317,688 | B1 * | 11/2001 | Bruckner et al. | 701/213 |
| 6,417,802 | B1 * | 7/2002 | Diesel | 342/357.14 |
| 6,496,778 | B1 * | 12/2002 | Lin | 701/215 |
| 6,516,272 | B2 * | 2/2003 | Lin | 701/214 |
| 6,639,549 | B2 * | 10/2003 | Vanderwerf et al. | 342/357.02 |
| 6,697,736 | B2 * | 2/2004 | Lin | 701/214 |
| 6,982,669 | B2 * | 1/2006 | Coatantiec et al. | 342/357.14 |
| 2002/0109628 | A1 * | 8/2002 | Diesel | 342/357.14 |
| 2003/0117317 | A1 * | 6/2003 | Vanderwerf et al. | 342/357.02 |
| 2003/0149528 | A1 * | 8/2003 | Lin | 701/214 |
| 2004/0239560 | A1 * | 12/2004 | Coatantiec et al. | 342/357.14 |
| 2004/0267444 | A1 * | 12/2004 | Coatantiec et al. | 701/202 |
| 2007/0156338 | A1 * | 7/2007 | Coatantiec et al. | 701/214 |
| 2007/0265810 | A1 * | 11/2007 | Martin et al. | 702/190 |

FOREIGN PATENT DOCUMENTS

| | | | |
|---|---|---|---|
| FR | 2832796 A1 * | 5/2003 | |
| FR | 2866423 A1 * | 8/2005 | |
| FR | 2895073 A1 * | 6/2007 | |
| WO | WO 03029755 A1 * | 4/2003 | |
| WO | WO 03046482 A1 * | 6/2003 | |
| WO | WO 2005088337 A1 * | 9/2005 | |
| WO | WO 2007135115 A1 * | 11/2007 | |

OTHER PUBLICATIONS

Abstract WO 01/46712 Thales Avionics SA Jun. 28, 2001.
Abstract FR 2 830 320 A Apr. 4, 2003 Thales.

* cited by examiner

DEVICE FOR MONITORING THE INTEGRITY OF INFORMATION DELIVERED BY A HYBRID INS/GNSS SYSTEM

CROSS-REFERENCE TO RELATED APPLICATIONS

The present Application is based on International Application No. PCT/EP2005/050390, filed on Jan. 31, 2005 and priority is hereby claimed under 35 USC §119 based on this application.

BACKGROUND OF THE INVENTION

1. Field of the Invention

The invention relates to the monitoring of the integrity of position and speed information obtained from a hybridization between an inertial unit and a satellite positioning receiver. It more specifically relates to a navigation device known in the art by the name of INS/GNSS (standing for "Inertial Navigation System" and "Global Navigation Satellite System") that is hybridized in closed loop mode, the hybridization being said to be loose because it is implemented on geographic lines.

2. Description of the Related Art

An inertial unit is made up of a set of inertial sensors (gyrometric sensors and accelerometric sensors) associated with electronic processing circuitry. A computation platform, called virtual platform PFV, then delivers the speed and position information of the bearer in a precise frame of reference (denoted LGT, or local geographic trihedron). The virtual platform PFV is used to project and integrate the data obtained from the inertial sensors. The inertial unit supplies information that is accurate in the short term but tends to drift in the long term (under the influence of sensor defects). Control of the sensor defects represents a very high proportion of the cost of the inertial unit.

A satellite positioning receiver supplies position and speed information concerning the bearer by triangulation based on the positions of orbiting satellites visible to the bearer. The information supplied can be temporarily unavailable because the receiver needs to have in direct view a minimum of four satellites of the positioning system to be able to establish a point. It is also of variable accuracy, dependent on the geometry of the constellation on which the triangulation is based, and affected by noise because of the reliance on the reception of very weak signals originating from distant satellites having a low transmit power. However, they are not subject to drift in the long term, the positions of the orbiting satellites being known accurately in the long term. The noises and errors can be linked to the satellite systems, to the receiver or to the propagation of the signal between the satellite transmitter and the GNSS signal receiver. Furthermore, the satellite data may be erroneous as a consequence of failures affecting the satellites. This non-integrated data must then be identified to prevent it from falsifying the position obtained from the GNSS receiver.

To anticipate the satellite failures and ensure the integrity of the GNSS measurements, a known method is to equip a satellite positioning receiver with a so-called RAIM (Receiver Autonomous Integrity Monitoring) system (an accuracy and availability estimation system) which is based on the geometry of the satellite constellation used in the triangulation and on the predictable short-term trend of this geometry deduced from the knowledge of the trajectories of the satellites. However, this system, purely linked to the satellite location system, is not applicable to the monitoring of a location point derived from a hybrid system (INS/GNSS) and can detect only certain types of failures in a given time.

The hybridization consists in mathematically combining the position and speed information supplied by the inertial unit and the satellite positioning receiver to obtain position and speed information by exploiting both systems. Thus, the accuracy of the positioning information supplied by the GNSS system can be used to control the inertial drift and the inertial measurements that are little affected by noise can be used to filter the noise on the measurements of the GNSS receiver. This combination very often makes use of the Kalman filtering technique.

Kalman filtering is based on the possibilities of modeling the trend (or evolution) of the state of a physical system considered in its environment, by means of a so-called "evolution" equation (a priori estimation), and of modeling the dependency relationship existing between the states of the physical system concerned and the measurements by which it is perceived from outside, by means of a so-called "observation" equation to allow for a readjustment of the states of the filter (a posteriori estimation). In a Kalman filter, the actual measurement or "measurement vector" is used to produce an a posteriori estimate of the state of the system which is optimal in the sense that it minimizes the covariance of the error made on this estimation. The estimator part of the filter generates a priori estimates of the state vector of the system using the deviation observed between the actual measurement vector and its a priori prediction to generate a corrective term, called innovation. This innovation is applied to the a posteriori estimate of the state vector of the system and results in the optimal a posteriori estimate being obtained.

In the case of a hybrid INS/GNSS system, the Kalman filter receives the position and speed points supplied by the inertial unit and the satellite positioning receiver, models the trend of the errors of the inertial unit and delivers the a posteriori estimate of these errors which is used to correct the positioning and speed point of the inertial unit.

The estimation of the position and speed errors due to the defects of the inertial sensors appearing at the output of the virtual platform PFV of the inertial unit is produced by the Kalman filter. The correction of the errors through the intermediary of their estimation done by the Kalman filter can then be done at the input of the virtual platform PFV (closed loop architecture) or at the output (open loop architecture).

When the defects of the sensors of the inertial unit are not too great, there is no need to apply the corrections at the input of the virtual platform PFV. The modeling of the system (linearization of the equations governing the evolution of the system) within the filter remains valid. The a posteriori estimate of the errors of the inertial unit calculated in the Kalman filter is used only to create the best estimate of the position and speed of the bearer given the position and speed information supplied by the inertial unit and by the GNSS receiver. The hybridization is then said to be "open loop".

When the inertial defects are too great, the linearization of the equations governing the evolution of the inertial model integrated within the Kalman filter is no longer valid. It is therefore essential to apply the corrections to the virtual platform PFV to remain within the linear domain. The a posteriori estimate of the errors the inertial unit calculated in the Kalman filter is used not only to create the best estimate of the position and speed of the bearer, but also to readjust the inertial unit within the virtual platform PFV. The hybridization is then said to be "closed loop".

The hybridization can also be done by observing GNSS information of different types. Either, the position and speed of the bearer resolved by the GNSS receiver can be considered, in which case the hybridization is said to be "loose", or the information extracted upstream by the GNSS receiver—the pseudo-distances and pseudo-speeds (quantities directly derived from the measurement of the propagation time and from the Doppler effect of the signals sent by the satellites to the receiver)—can be considered, in which case the hybridization is said to be "tight".

With a closed loop INS/GNSS system in which the point resolved by the GNSS receiver is used to readjust the information originating from the inertial unit, it is necessary to pay particular attention to the defects affecting the information supplied by the satellites, because the receiver that receives the information will propagate these defects to the inertial unit, resulting in an incorrect readjustment of the latter. The problem becomes particularly critical when it comes to ensuring the integrity of a hybrid INS/GPS point.

A known way of proceeding to monitor the integrity of an INS/GNSS hybrid system in closed loop mode is disclosed in U.S. Pat. No. 5,583,774. It consists in spacing the readjustments by a time that is long enough (for example 30 minutes) for a Kalman-filter-based detector monitoring the trend of the pseudo-distance and pseudo-speed measurement deviations, relative to the bearer of each visible satellite, to be able to isolate the malfunctioning satellites.

Another known method for monitoring the integrity of an INS/GNSS hybrid system is disclosed in U.S. Pat. No. 5,923, 286. It involves the use of an RAIM device to enable or disable the hybridization. When the RAIM device signals a loss of integrity, the hybridization is frozen and the position and speed point is supplied by the INS unit taking into account its drifts and bias measured just before the loss of integrity. For this to work, it is essential for the inertial unit not to have been corrupted by the point error committed by the GNSS receiver, which prohibits that being readjusted with the GNSS receiver. The method is therefore reserved only for the open loop INS/GNSS hybrid systems.

SUMMARY OF THE INVENTION

It is an object of the present invention to monitor the integrity of the position and speed information of a hybrid system comprising an inertial unit readjusted with the help of a GNSS receiver by using the resolved position and speed of the bearer obtained from the GNSS receiver.

Briefly stated, the present invention is directed to a device for monitoring the integrity of a hybrid system comprising an inertial unit INS, a GNSS satellite positioning receiver operating on the basis of a constellation of N visible satellites and a Kalman hybridization filter having a state vector corresponding to the errors of the hybrid system, in particular, the bias and residual drift errors of the inertial unit INS, observing the deviations between the positioning and speed points supplied, in the form of geographic coordinates, by the inertial unit INS and by the GNSS receiver, having an evolution matrix F modeling the trend of the errors of the hybrid system, an observation matrix H modeling the relationships between the state vector and the deviations observed between the positions and the speeds delivered by the inertial unit INS and the GNSS receiver, and a gain K minimizing the covariance of the error made on the a posteriori estimation of the position and speed errors derived from the inertial unit, and delivering an a posteriori estimate of the errors of the hybrid system used to readjust the inertial unit. This monitoring system is noteworthy in that the GNSS receiver delivers, in addition to a position point established from the N satellites of the constellation that is has in view, N−1 position points established from the constellation of the N visible satellites deprived, each time, of a different satellite and in that it comprises a satellite problem-detector circuit comprising a bank of N predictor/estimator filters of the error induced by the satellite that was removed on resolving a point with N−1 satellites, having the gain K and the evolution matrix F of the Kalman hybridization filter, each filter observing the deviation between the position point, in the form of geographic coordinates, delivered by the GNSS receiver by observing the N visible satellites and one of the position points, also in the form of geographic coordinates, delivered by the GNSS receiver by observing N−1 visible satellites and test circuits comparing the states of the N predictor/estimator filters with their variances and detecting a satellite failure when the test is positive, the deviation found being greater than a detection threshold.

Advantageously, the test circuits have satellite-failure detection thresholds that result from statistical tests taking account of the covariance associated with the type of positioning error concerned.

Advantageously, the test circuits have satellite-failure detection thresholds that result from statistical tests taking account of the covariance associated with the type of positioning error concerned and that are a function of the acceptable false alarm ratio for the test.

Advantageously, the monitoring system comprises a readjustment inhibition circuit inserted between the output of the Kalman hybridization filter and a readjustment input of the inertial unit, and activated by a positive satellite problem-detection test.

Advantageously, the predictor/estimator filters of the satellite problem-detector circuit (first filter bank) all have the same observation matrix.

Advantageously, the GNSS receiver also delivers position points, in the form of geographic coordinates, established from the N visible satellites and those established from N−1 satellites deducted from the constellation formed by the N visible satellites by each time removing a different visible satellite, N×(N−1)/2 position points with N−2 satellites deducted from the N visible satellites by each time removing two different visible satellites, and the monitoring system comprises a malfunctioning-satellite identification circuit comprising a second bank of N×(N−1)/2 positioning deviation predictor/estimator filters having the gain K and the evolution matrix F of the Kalman hybridization filter, each filter observing the deviation between a position point, in the form of geographic coordinates, delivered by the GNSS receiver from N−1 satellites out of the N visible satellites and one of the positioning points delivered by the satellite positioning receiver from N−2 satellites out of the N visible satellites deducted from the specific constellation of (N−1) visible satellites deprived of one of its visible satellites, the estimator-detector filters being able to be grouped in families of N−2 elements according to the specific constellation of N−1 visible satellites taken into account, test circuits comparing the states of the N×(N−1)/2 predictor/estimator filters with their variances in order to detect any anomaly and a processing circuit identifying, if anomalies are detected, a faulty satellite as being the satellite excluded from a point with n−1 satellites for which the family of predictor/estimator filters is the only one not to have any of its elements detecting an anomaly.

Advantageously, the predictor/estimator filters of the malfunctioning-satellite identification circuit all have the same observation matrix.

Advantageously, the predictor/estimator filters of the satellite problem-detector and of the malfunctioning-satellite identification circuit all have the same observation matrix.

BRIEF DESCRIPTION OF THE DRAWINGS

Other characteristics and advantages of the invention will become apparent from the description that follows of an embodiment given by way of example. This description is given in light of the drawing in which.

DETAILED DESCRIPTION OF THE EMBODIMENTS

Figure 1:
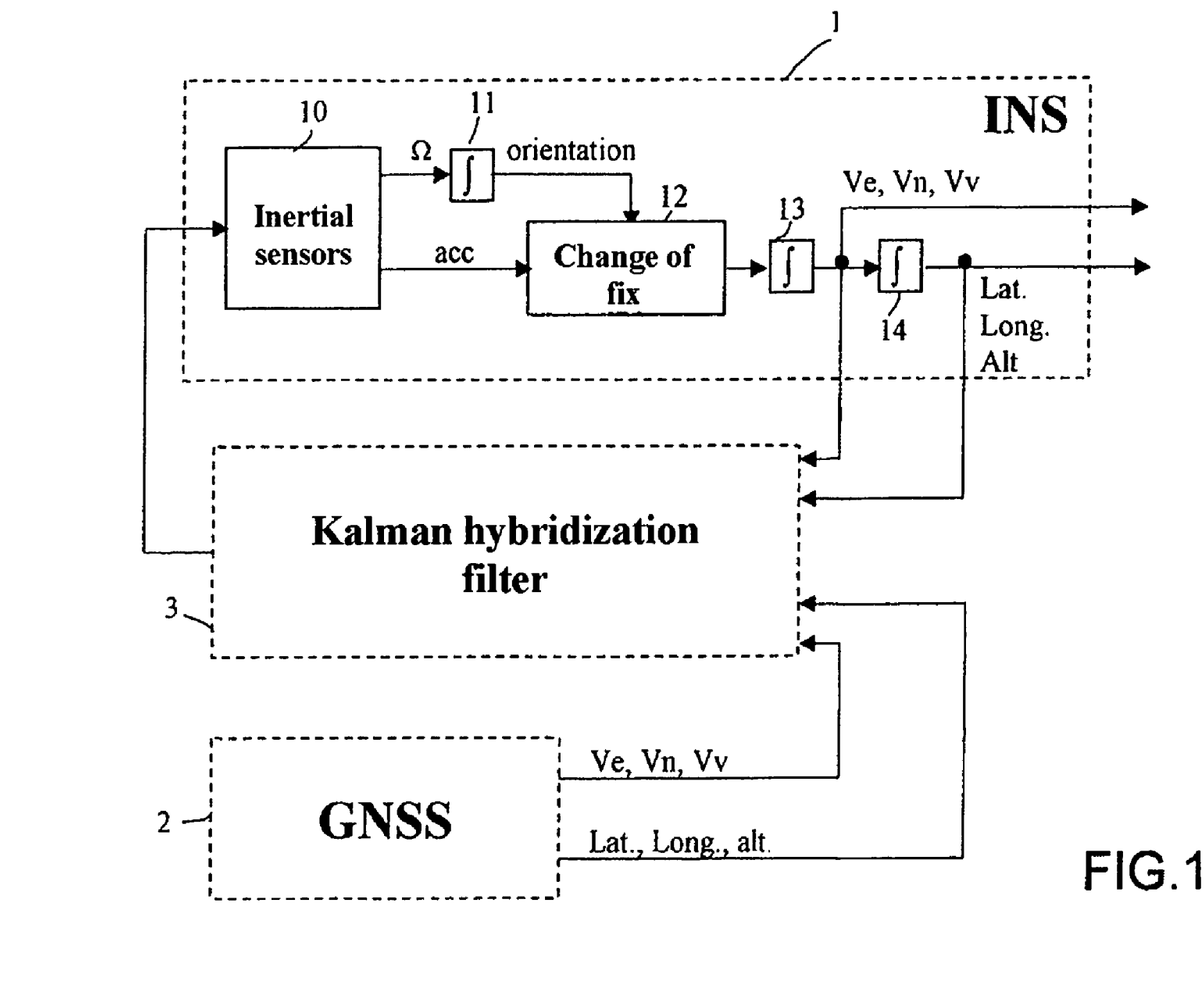
FIGS. 1 and 2 represent a theoretical diagram of a closed loop, loose type hybrid INS/GNSS positioning system, FIG. 1 detailing the inertial unit and FIG. 2 the Kalman filter.

FIG. 1 shows the architecture of a hybrid positioning system equipped with an inertial unit 1 and a GNSS satellite positioning receiver 2, said to be in closed loop mode and of loose type, because it uses resolved position (latitude, longitude and altitude) and speed (speed north, speed east and speed vertical) information concerning the bearer delivered by the GNSS receiver 2 for readjusting of the inertial unit INS 1.

As shown, the inertial unit comprises a set 10 of inertial sensors (accelerometers and gyrometers) and computation circuits, called virtual platform PFV, to perform the position, attitude and speed computations on the outputs of the inertial sensors. The virtual platform PFV mainly comprises a set of integrators 11 operating on the signals Ω of the gyrometers in order to deduce from them the attitude of the bearer, a fix changer 12 used, based on the knowledge of the orientation of the bearer (attitude), to express within a geographic fix linked to the Earth, the accelerations acc measured by the accelerometers within a fix linked to the bearer and two successive integrator sets 13, 14 operating on the components of the acceleration according to the geographic fix, to deduce from them the components of the speed of the bearer relative to the north Vn, relative to the east Ve and relative to the vertical Vv as well as the position of the bearer in latitude, longitude and altitude. The inertial sensors are subject to defects inherent in their design: biases and drifts that make the position and attitude information delivered by an inertial unit degrade over operating time. Trying to overcome these defects is costly, so there are various classes of inertial unit according to accepted bias and drift tolerances.

The GNSS receiver 2 is, for example, a GPS receiver. It measures the pseudo-distances and pseudo-speeds of the bearer relative to at least four satellites visible to the bearer of the hybrid positioning system and resolves, by triangulation, the position of the bearer in latitude, longitude and altitude, as well as the components of its speed relative to the north Vn, relative to the east Ve and relative to the vertical Vv. It will not be described in more detail because it is well known to those skilled in the art and widely described in the literature in which numerous works are devoted to it, such as, for example the book by Elliot D. KAPLAN entitled "Understanding GPS Principles and Applications", published by Artech House Publishers, ISBN 0-89006-793-7. The position and speed information delivered by a GNSS receiver is not subject to drift since it originates from instantaneous measurements of separation distances and speeds of separation of satellites for which the orbits and the positions in their orbits are known in the long term. However, it is subject to unavailability, when there are not at least four satellites visible. It is affected by noise because it originates from the processing of received signals that are very weak because of the distance separating the satellites and their weak transmit powers and that may have been corrupted during transmission (encountering charged particles between the satellite and the receiver). The reliability of the information depends on that of the information transmitted by the satellites.

Compared to the GNSS receiver, the inertial unit has the advantage of not requiring the collaboration of equipment external to the bearer and therefore of not being so sensitive to the external environment. Since the integrity and availability of the inertial information is much better, the inertial unit retains all its interest. To fight against its drift and bias other than by costly measurements taken on its inertial sensors, a periodic readjustment is proposed by means of the position and speed point supplied by a GNSS receiver, after an anti-noise filtering.

Figure 2:
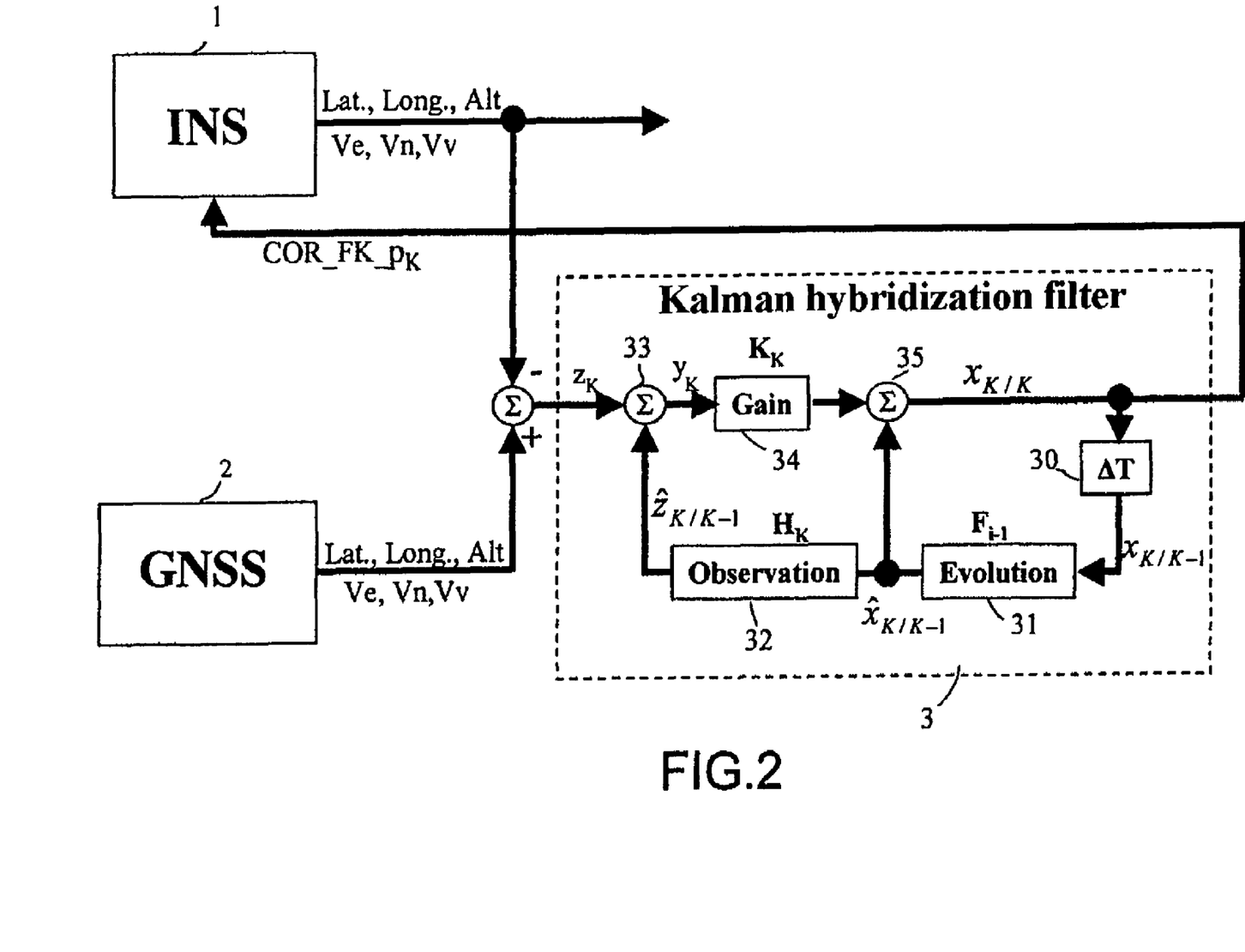

This readjustment is done using a so-called Kalman hybridization filter 3 shown in greater detail in FIG. 2.

A Kalman filter is used to obtain an estimation of the a posteriori state of a system, optimal in the sense that the covariance of the error made on this a posteriori estimation is minimal (also referred to as optimal estimation in the least squares sense). It is based on a modeling of the evolution of the system and on a modeling of the relationship existing between the measurement and the state of the system.

In its most general meaning, the modeling of the evolution of the state of the system is defined by a first order, linearized vectorial differential equation which is expressed, after discretization of the continuous model, by an evolution equation which takes the form:

$$x_{K+1} = F_K x_K + L_K u_i + w_K$$

x being the dimension state vector p, u a control vector, $F_K$ the evolution matrix defining the relationship between the state vector in the step K and the state vector in the step K+1 in the absence of control vector and operating noise, $L_K$ being a matrix defining the relationship between the control vector and the state vector during one and the same step and $w_K$ being an operating noise during a step, assumed to be white and Gaussian of zero average value.

The modeling of the relationship existing between the measurement and the state of the system is defined by another first order differential equation that expresses, after discretization of the continuous model, by an observation equation that takes the form:

$$z_K = H_K x_K + v_K$$

z being the dimension measurement vector m (physically observable system quantities), $H_K$ being the observation matrix defining the relationship between the measurement vector and the state vector during one and the same step and $v_K$ being a measurement noise during a step assumed to be white and Gaussian of zero average value.

The Kalman filter shown in FIG. 2 does not include a control vector and therefore has no matrix $L_K$. It is recursive and relies on the determination of an a priori estimation $\hat{x}_{K/K-1}$ of the state vector of the system in the step K from the a posteriori knowledge of the state vector of the system $x_{K-1/K-1}$ in the preceding step K−1 and on the application to the a priori estimate $\hat{x}_{K/K-1}$ of a correcting term dependent on the deviation observed between the measurement vector $z_K$ observed during this step K and its a priori estimate $\hat{z}_{K/K-1}$ deducted from the a priori estimation $\hat{x}_{K/K-1}$ of the state vector.

The a priori estimate $\hat{z}_{K/K-1}$ of the measurement vector in the step K is determined by application of evolution and observation equations to the a posteriori estimate $x_{K-1/K-1}$ of the state vector corresponding to the preceding step K−1. This operation is illustrated in FIG. 2 by the presence of a retroaction loop comprising a delay circuit 30 and two filters 31, 32.

The delay circuit 30 connected to the output of the Kalman filter is used to store the a posteriori estimate $\hat{x}_{K-1/K-1}$ of the state vector available at the output of the Kalman filter during the preceding step K−1.

The filter 31 is used, by implementing the evolution equation, to obtain the a priori estimate $\hat{x}_{K/K-1}$ of the state vector in the step K, from the a posteriori estimate $\hat{x}_{K-1/K-1}$ of the state vector of the system in the preceding step K−1. Its transfer function is defined by the matrix $F_{K-1}$ of the evolution equation.

This a priori estimate $\hat{x}_{K/K-1}$ of the state vector in the step K is then used to obtain, by means of a second filter 32, the a priori estimate $\hat{z}_{K/K-1}$ of the measurement vector in the step K by application of the observation equation. To do this, this second filter 32 has a transfer function defined by the matrix $H_K$ of the observation equation.

The a priori estimate $\hat{z}_{K/K-1}$ of the measurement vector in the step K obtained in the retroaction loop is applied, as input to the Kalman filter, to a subtractor circuit 33 which also receives the measurement vector $z_K$ actually measured during the step K and which delivers an error vector $r_K$, also called innovation, attesting to the error committed in the a priori estimation. This error vector $r_K$ is transformed by a third filter 34 into a correction vector. This correction vector is added by a second summer 35 to the a priori estimate $\hat{x}_{K/K-1}$ of the state vector for the step K derived from the first filter 31, to obtain the a posteriori estimate $x_{K/K}$ of the state vector that constitutes the output of the Kalman filter.

The third filter 34, which supplies the corrective term, is known as a readjustment gain filter. It has a transfer function defined by a matrix $K_K$ determined so as to minimize the covariance of the error made on the a posteriori estimation.

Kalman showed that the optimal gain matrix $K_K$ could be determined by a recursive method from the equations:

of the covariance matrix of the a priori estimate of the state vector $$P_{K/K-1} = F_{K-1} P_{K-1/K-1} F_{K-1}^T + Q_{K-1}$$

for defining the gain matrix itself $$K_K = P_{K/K-1} H_K^T (H_K P_{K/K-1} H_K^T + R_K)^{-1}$$

for updating the covariance matrix of the a posteriori estimate of the state vector $$P_{K/K}(I - K_K H_K) P_{K/K-1}$$

P being the covariance matrix of the state vector, either estimated a priori for the step K from the step K−1 if P is assigned the index K/K−1, or estimated a posteriori if P is assigned the index K−1/K−1,
R being the covariance matrix of the observation noises $w_K$,
Q being the covariance matrix of the state noises (or operating noises) $v_K$.

On initialization, the covariance matrix of the state vector and the state vector are taken to be equal to their most probable estimates. At worst, the covariance matrix is a diagonal matrix with infinite or extremely large terms (so as to have very great standard deviations given the field in which the state vector is likely to evolve) and the estimate of the state vector is the zero vector, when the initial values are absolutely unknown.

In practice, the correction gain of a Kalman filter is "proportional" to the uncertainty on the a priori estimate of the state of the system and "inversely proportional" to the uncertainty on the measurement. If the measurement is highly uncertain and the estimation of the state of the system is relatively accurate, the observed deviation is mainly due to the measurement noise and the consequential correction must be small. On the other hand, if the uncertainty on the measurement is low and that on the estimation of the state of the system is high, the observed deviation is highly representative of the estimation error and should result in a big correction. This is the behavior towards which there is a tendency with the Kalman filter.

In summary, a Kalman filter with no control vector is defined by a matrix $F_K$ corresponding to the evolution equation defining the evolution of the state vector of the physical system being modeled, a matrix $H_K$ corresponding to the observation equation defining the relationships used to pass from the state vector to the measurement vector and a gain matrix $K_K$ updated using an iterative process involving the covariance matrix of the state vector P, itself updated during the iterative process, and the covariance matrices $Q_K$ and $R_K$ of the state and measurement noises.

The Kalman filter 3 operates on the deviations observed between two versions of information of the same type, one originating from the inertial unit INS 1 and the other from the GNSS receiver 2, because this makes it possible to work on variables having more restricted variation ranges on which the linear approximation can be used to simplify the modeling and evolution equations (the term "error filter" is then used).

In this context, the evolution equation of the Kalman filter models the predictable trend of the errors on the hybrid system linked to the residual values of the inertial sensor defects not estimated and to the mechanization of the inertial platform (in this case closed loop) of the inertial unit 1 that it deduces from the differences observed between the deviation forecast that it makes and the deviations actually measured between the position and the speed derived from the inertial unit and from the GNSS receiver. It is determined by the matrix F, the definition of which is a function of the motion of the bearer, that is, of the flight parameters in the case where the bearer equipped with the hybrid positioning system is an aircraft. The definition of the different versions of this matrix F as a function of the motion parameters of the bearer falls outside the scope of the present invention. It will not be detailed below because it is well known to those skilled in the art specializing in the field of inertia.

The residual values $x_{K/K}$ of the errors of the hybrid system estimated a posteriori by the Kalman hybridization filter 3 are used to readjust the INS inertial unit 1 (closed loop). Since the INS 1 inertial information is regularly readjusted, the hybrid position and speed points are assumed more reliable provided that the GNSS measurements are integrated.

To sum up, the processing carried out by the Kalman hybridization filter is divided into three stages:

Propagation of the state vector and of the associated variance-covariance matrix $$X_{K+1/K} = F_{K+1} \cdot X_{K/K} + COR\_FK\_p_K$$

$$P_{K+1/K} = F_K \cdot P_{K/K} \cdot F_K^T + Q_K$$

Readjusting of the state vector and of the variance-covariance matrix using the gain $K_{K+1}$ $$K_{K+1} = P_{K+1/K} \cdot H_{K+1}^T \cdot (H_{K+1} \cdot P_{K+1/K} \cdot H_{K+1}^T + R_{K+1})^{-1}$$

$$X_{K+1/K+1} = X_{K+1/K} + K_{K+1} \cdot (Z_{K+1} - H_{K+1} \cdot X_{K+1/K})$$

$$P_{K+1/K+1} = P_{K+1/K} - K_{K+1} \cdot H_{K+1} \cdot P_{K+1/K}$$

Application of the corrections derived from the Kalman hybridization filter to the inertial unit $$COR\_FK\_p_K = -X_{K/K}$$

The observation matrix $H_{K+1}$ is used to observe the differences between the positions and speeds derived from the virtual platform PFV and the resolved GNSS positions and speeds. The evolution matrix $F_{K+1}$ is computed using the data from the virtual platform PFV corrected by the Kalman filter and is used to propagate the state and the associated variance-covariance matrix.

The problem encountered with the closed loop INS/GNSS hybrid positioning systems is the risk of seeing the readjustment operations propagate to the inertial unit 1 the position and speed errors committed by the GNSS receiver 2 because of defective information reaching it from one or more malfunctioning satellites (poor corrections applied by the Kalman filter to the virtual platform PFV, poor estimation of inertial defects). The integrity of the closed loop INS/GNSS hybrid positioning system is then difficult to ensure.

Figure 3:
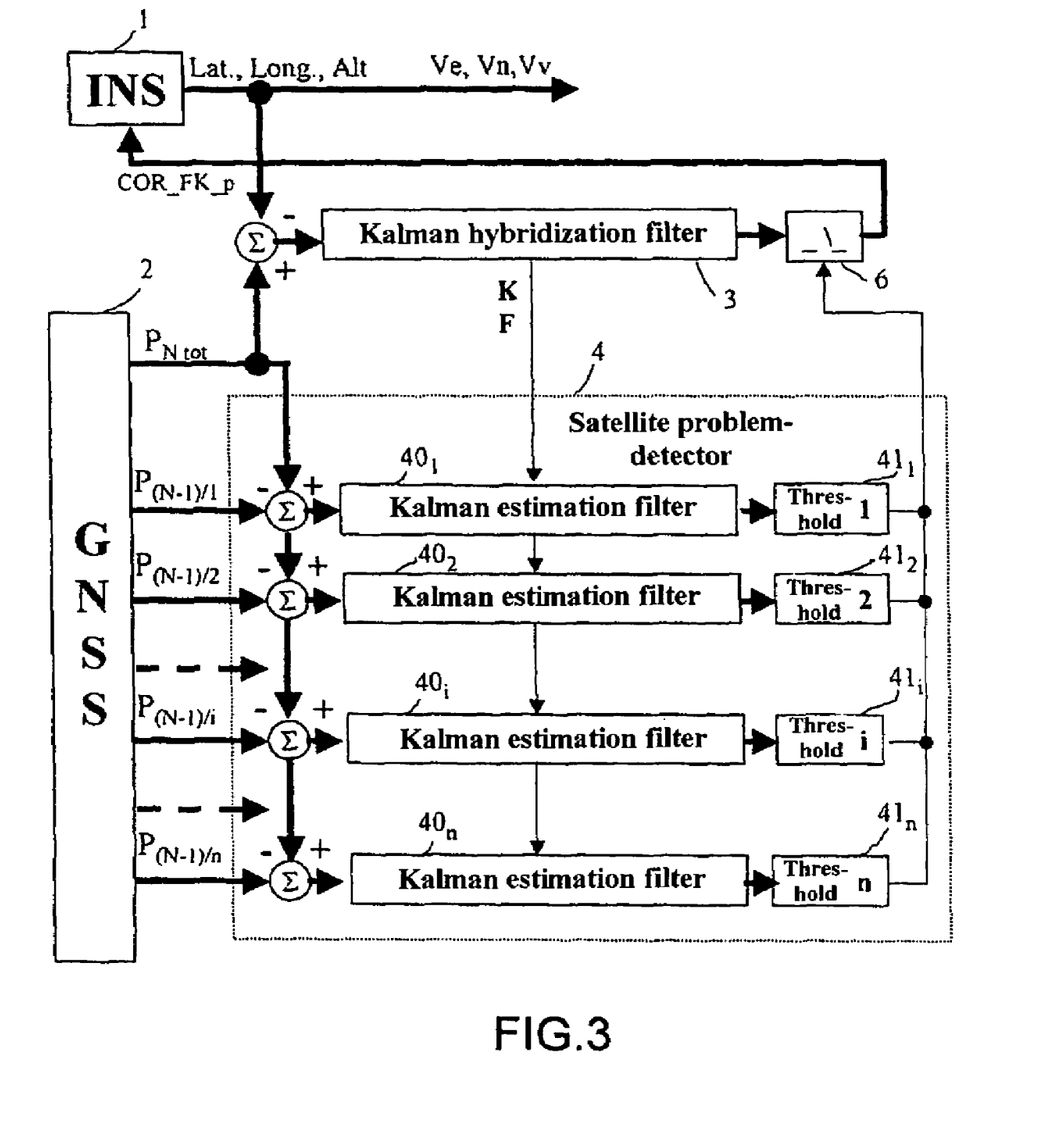
FIG. 3 represents a hybrid INS/GNSS positioning system provided with a satellite problem-detector circuit compliant with the invention.

FIG. 3 is the diagram of a closed loop INS/GNSS hybrid system equipped with a satellite problem-detector operating on position points, in the form of geographic coordinates, performed by the GNSS receiver 2 with all the visible satellites assumed to number N and with all the visible satellites minus one of them, the visible satellite that is set aside being any one of them.

The satellite problem-detector 4 comprises a bank of N predictor/estimator filters $40_1, 40_2, \ldots, 40_i, \ldots, 40_N$ associated with a bank of test circuits $41_1, 41_2, \ldots, 41_i, \ldots, 41_N$ controlling, via an inhibition circuit 5 inserted at the output of the Kalman hybridization filter 3, the possibility of readjustment of the inertial unit 1.

The predictor/estimator filters $40_1, 40_2, \ldots, 40_i, \ldots 40_N$ operate in open loop mode.

The state vector of the $i^{th}$ predictor/estimator filter $40_i$ is made up of the errors relative to the state vector of the Kalman hybridization filter induced by the fact that the information given by the $i^{th}$ visible satellite has not been taken into account in the GNSS receiver 2, and even more generally relative to measurements made by other navigation equipment such as a barometric altimeter or an anemometer.

$$Err^i = \begin{bmatrix} \text{attitude\_errors\_relative\_to\_FK} \\ \text{speed\_errors\_relative\_to\_FK} \\ \text{position\_errors\_relative\_to\_FK} \\ \text{accelero\_bias\_errors\_relative\_to\_FK} \\ \text{gyro\_drift\_errors\_relative\_to\_FK} \\ \text{baro\_errors\_relative\_to\_FK} \\ \text{anemo\_errors\_relative\_to\_FK} \end{bmatrix}$$

The evolution matrices $F_K$ of the various predictor/estimator filters $40_1, 40_2, \ldots, 40_i, \ldots, 40_N$ are identical to that $F_K$ of the Kalman hybridization filter 3:

$$\hat{Err}_{K+1/K}^i = F_{K+1} \cdot Err_{K/K}^i \qquad (1)$$

The measurement $Z^i$ of an $i^{th}$ predictor/estimator filter $40_i$ is made up of the deviation between the position, in the form of geographic coordinates (latitude, longitude and altitude), resulting from the positioning point $P_{Ntot}$ established by the GNSS receiver 2 taking into account all the N visible satellites and the position, in the form of geographic coordinates, resulting from the positioning point $P_{(N-1)/i}$ established by the GNSS receiver 2 by setting aside the information sent by the $i^{th}$ satellite:

$$Z^i = \begin{pmatrix} \Delta x^i \\ \Delta y^i \\ \Delta z^i \end{pmatrix} = P_{N-1/i} - P_{Ntot}$$

The observation matrices H of the different predictor/estimator filters $40_1, 40_2, \ldots, 40_i, \ldots, 40_N$ are all identical and correspond to the observation equation used to pass from the state vector $Err^i$ to the measurement vector $Z^i$.

The gains of the different predictor/estimator filters $40_1, 40_2, \ldots, 40_i, \ldots, 40_N$ are all taken to be equal to that K of the Kalman hybridization filter 3 such that the readjustment on the measurements $z^i$ that they receive takes place like the readjustment of the Kalman hybridization filter 3.

Given these choices, the readjustments of the state vectors $Err^i$ of the predictor/estimator filters $40_1, 40_2, \ldots, 40_i, \ldots, 40_N$ satisfy the relation:

$$Err_{K+1/K+1}^i = Err_{K+1/K}^i + K_{K+1} \cdot (Z_{K+1}^i - H_{K+1} \cdot Err_{K+1/K}^i) \qquad (2)$$

To detect the failure of at least one of the N visible satellites by the GNSS positioning receiver 2, statistical tests are run on the state vectors $Err^i$ available at the output of the different predictor/estimator filters $40_1, 40_2, \ldots, 40_i, \ldots, 40_N$ by means of the bank of test circuits $41_1, 41_2, \ldots, 41_i, \ldots, 41_N$. These test circuits run statistical tests consisting in admitting a satellite failure if, for i ranging from 1 to the number N of visible satellites, one of the following two inequalities on the position errors of the predictor/estimator filters $40_1, 40_2, \ldots, 40_i, \ldots, 40_N$ is satisfied:

$$\lfloor Err_{K+1/K}^i(err\_lat) * Err_{K+1/K}^i(err\_lat) \rfloor > K\_thresh * K\_thresh.COV\_Err_{K+1/K}^i(err\_lat)$$

or $$\lfloor Err_{K+1/K}^i(err\_lon) * Err_{K+1/K}^i(err\_lon) \rfloor > K\_thresh * K\_thresh.COV\_Err_{K+1/K}^i(err\_lon)$$

The variable K_thresh indirectly controls the value of the acceptable radial error. It is chosen as a function of the required false alarm ratio. For a false alarm probability of $10^{-6}$, a value of approximately 5.06 (Gaussian distribution) will be taken for the variable K_thresh.

To carry out these statistical tests, it is essential to be able to propagate and readjust the variances associated with the state vectors $Err^i$ of the different predictor/estimator filters $40_1, 40_2, \ldots, 40_i, \ldots, 40_N$. The propagation and readjustment can be carried out as follows:

On initialization, the following is assumed:

$$COV\_Err_{0/0}^i = [0]$$

[0] being the zero matrix.

On first propagation, by definition:

$$COV\_Err_{1/0}^i = E\lfloor \hat{Err}_{1/0}^i \cdot Err_{1/0}^{iT} \rfloor$$

which, because of the relation (1), is expressed:

$$COV\_Err_{1/0}^i = E\lfloor (F_1 \cdot Err_{0/0}^i + u_1^i)(F_1 \cdot Err_{0/0}^i + u_1^i)^T \rfloor$$

$u^i$ being a white noise (state noise).

Hence:

$$COV\_Err_{1/0}^i = F_1 \cdot COV\_Err_{0/0}^i \cdot F_1^T + Q_1$$

F being the evolution matrix of the Kalman hybridization filter 3 and $Q_1$ the covariance matrix of the state noises of the Kalman hybridization filter 3.

On first readjustment, by definition:

$$COV\_Err_{1/1}{}^i = E[Err_{1/1}{}^i . Err_{1/1}{}^{iT}]$$

which, taking into account the relation (2), is expressed:

$$COV\_Err_{1/1}{}^i = E[(Err_{1/0}{}^i + K_1.(Z^i - H_1.Err_{1/0}{}^i)).(Err_{1/0}{}^i + K_1.(Z^i - H_1.Err_{1/0}{}^i))^T]$$

By developing this expression, we find:

$$COV\_Err_{1/1}^i = E[Err_{1/0}^i \cdot Err_{1/0}^{iT}] + K_1 \cdot E[Z_i \cdot Z_i^T] K_1^T + K_1 \cdot H_1 \cdot E[Err_{1/0}^i \cdot Err_{1/0}^{iT}] H_1^T \cdot K_1^T \ldots - E[Err_{1/0}^i \cdot Err_{1/0}^{iT}] H_1^T \cdot K_1^T - K_1 \cdot H_1 \cdot E[Err_{1/0}^i \cdot Err_{1/0}^{iT}]$$

Hence:

$$COV\_Err_{1/1}{}^i = (I - K_1.H_1).COV\_Err_{1/0}{}^i.(I - K_1.H_1)^T + K_1.E[Z^i.Z^{iT}].K_1^T$$

I being the identity matrix.

The first term of the expression of the readjustment of the covariance matrix is computed from the observation matrix $H_i$ of the predictor/estimator filters $40_1, 40_2, \ldots, 40_i, \ldots, 40_N$ and the gain matrix $K_1$ of the Kalman hybridization filter 3. The second term is computed using the variance/covariance matrices used in the least squares computations performed for position, speed and time resolution in the GNSS receiver 2, on positioning points with N and (N−1) satellites. In practice, on this resolution, the least squares method estimates the degree of reliance on the points resolved by means of the variance/covariance matrices (matrices $E[P_{(n-1)/i}.P_{(n-1)/i}{}^T]$ for the N points with (N−1) satellites and $E[P_{tot}.P_{tot}{}^T]$ for the point with N satellites).

Now:

$$E[Z^i.Z_i^T] = E[(P_{(N-1)/i} - P_{tot})(P_{(N-1)/i} - P_{tot})^T]$$

Because:

$$Z^i = \begin{pmatrix} \Delta x^i \\ \Delta y^i \\ \Delta z^i \end{pmatrix} = P_{(N-1)/i} - P_{tot}$$

By developing the first expression, we obtain:

$$E[Z^i.Z^{iT}] = E[P_{(N-1)/i}.P_{(N-1)/i}{}^T] + E[P_{tot}.P_{tot}{}^T] - E[P_{(N-1)/i}.P_{tot}{}^T] - E[P_{tot}.P_{(N-1)/i}{}^T]$$

The first two terms are known. They are directly supplied by the least squares computations on resolution of the different position, speed and time points done by the GNSS receiver 2.

The terms $E[P_{(N-1)/i}.P_{tot}{}^T]$ and $E[P_{tot}.P_{(N-1)/i}]$, reflecting the intercorrelation between the positioning point $P_{tot}$ with N satellites and the positioning points $P_{(N-1)/i}$ with (N−1) satellites, can be evaluated by repeating the least squares expression of each point.

In practice, we have:

$$P_{(N-1)/i} = H^*_{(N-1)/i}.d$$

$H^*_{(N-1)/i}$ being the pseudo-inverse matrix used in the position, speed and time resolution done on the positioning point established with N−1 satellites (absence of the $i^{th}$ satellite):

$H^*_{(N-1)/i} = (H_{(N-1)/i}{}^T.H_{(N-1)/i})^{-1}.H_{(N-1)/i}{}^T$ being constructed from the matrix H which is the matrix of the directing cosines linking the pseudo-distances d to the position resolved by the relation: $d = H_{(N-1)/i}.P_{(N-1)/i}$ d being the vector formed by the pseudo-distances.

Thus:

$$E[P_{(N-1)/i} \cdot P_{tot}^T] = E[(H^*_{(N-1)/i} \cdot d) \cdot (H^*_{tot} \cdot d)^T]$$
$$= E[d \cdot d^T] \cdot H^*_{(N-1)/i} H^{*T}_{tot}$$

Now:

$$H^*_{(N-1)/i} \cdot H^{*T}_{tot} = (H^T_{(N-1)/i} \cdot H_{(N-1)/i})^{-1} \cdot H^T_{(N-1)/i} \cdot H_{tot} \cdot \{(H^T_{tot} \cdot H_{tot})^{-1}\}^T$$

and:

$$\{(H_{tot}{}^T.H_{tot})^{-1}\}^T = (H_{tot}{}^T.H_{tot})^{-1}$$

because the relation:

$$(H_{tot}{}^T.H_{tot})^{-1}(H_{tot}{}^T.H_{tot}) = I$$

results in:

$$\Leftrightarrow \{(H_{tot}{}^T.H_{tot})^{-1}(H_{tot}{}^T.H_{tot})\}^T = I$$
$$\Leftrightarrow H_{tot}{}^T.H_{tot}.\{(H_{tot}{}^T.H_{tot})^{-1}\}^T = I$$
$$\Leftrightarrow (H_{tot}{}^T.H_{tot})^{-1} = \{(H_{tot}{}^T.H_{tot})^{-1}\}^T$$

Therefore:

$$H^*_{(N-1)/i} H^{*T}_{tot} = (H_{(N-1)/i}{}^T.H_{(N-1)/i})^{-1}.H_{(N-1)/i}{}^T.H_{tot}.(H_{tot}{}^T.H_{tot})^{-1}$$

Furthermore, the following equality is obtained:

$$H_{tot}{}^T.H_{(N-1)/i} = H_{(N-1)/i}{}^T H_{N-1/i}$$

The matrix $H_{(N-1)/i}$ differs from the matrix $H_{tot}$ only by the $i^{th}$ line which is zero in the case of the matrix $H_{(N-1)/i}$ and which includes the directing cosines of the line in view of the $i^{th}$ satellite in the case of the matrix $H_{tot}$. By calculating the product of matrices $H_{tot}{}^T.H_{(N-1)/i}$ the terms of the $i^{th}$ column of the matrix $H_{tot}{}^T$ are multiplied by the zero terms of the matrix $H_{(N-1)/i}$. Thus, if the terms of the $i^{th}$ column of a matrix multiplied by the matrix $H_{(N-1)/i}$ are already zero (as in the case of the matrix $H_{(N-1)/i}{}^T$), there is no change. This explains the above equality. Consequently:

$$H^*_{(N-1)/i} \cdot H^{*T}_{tot} = (H^T_{(N-1)/i} \cdot H_{(N-1)/i})^{-1} \cdot H^T_{(N-1)/i} \cdot H_{(N-1)/i} \cdot (H^T_{tot} \cdot H_{tot})^{-1}$$
$$= (H^T_{tot} \cdot H_{tot})^{-1}$$
$$= H^*_{tot} \cdot H^{*T}_{tot}$$

therefore:

$$E[P_{(N-1)/i}.P_{tot}{}^T] = E[P_{tot}.P_{tot}{}^T]$$

Finally, we have the relation:

$$E[Z^i.Z^{iT}] = E[P_{(N-1)/i}.P_{(N-1)/i}{}^T] - E[P_{tot}.P_{tot}{}^T]$$

which shows that the matrix $E[Z^i.Z^{iT}]$ can be evaluated from matrices derived from the computations of the different position, speed and time points performed by the GNSS receiver 2.

The first readjustment and the first propagation do not therefore pose any problem. The evolution $F_1$ and gain $K_1$ matrices used are those of the Kalman hybridization filter 3 whereas the observation matrix H is common to all the predictor/estimator filters $40_1, 40_2, \ldots, 40_i, \ldots, 40_N$.

By recurrence, it is possible to show that the same applies for the subsequent readjustments and propagations.

When at least one of the statistical tests is raised or positive, there is a suspicion that one of the visible satellites used by the GNSS receiver 2 to determine the position and speed of the bearer is malfunctioning. This overrun is used to trigger the inhibition circuit 5 inserted between the output of the Kalman hybridization filter 3 and the readjustment input of the inertial unit 1, the satellite providing erroneous data will be reintegrated only when all the statistical tests are no longer raised, with, where appropriate, an additional precautionary delay.

It will be noted that it is also possible to estimate a protection radius on the hybrid position derived from the inertial unit 1 by using the maximum separation method.

The satellite problem-detector circuit 4 cannot be used to identify the faulty satellite because the erroneous information originating from that satellite is taken into account in the point with N visible satellites used as a reference.

Bearing in mind that one of the visible satellites used by the GNSS receiver 2 is sending suspect information, it is advantageous to be able to identify it to have it set aside by the GNSS receiver 2.

Figure 4:
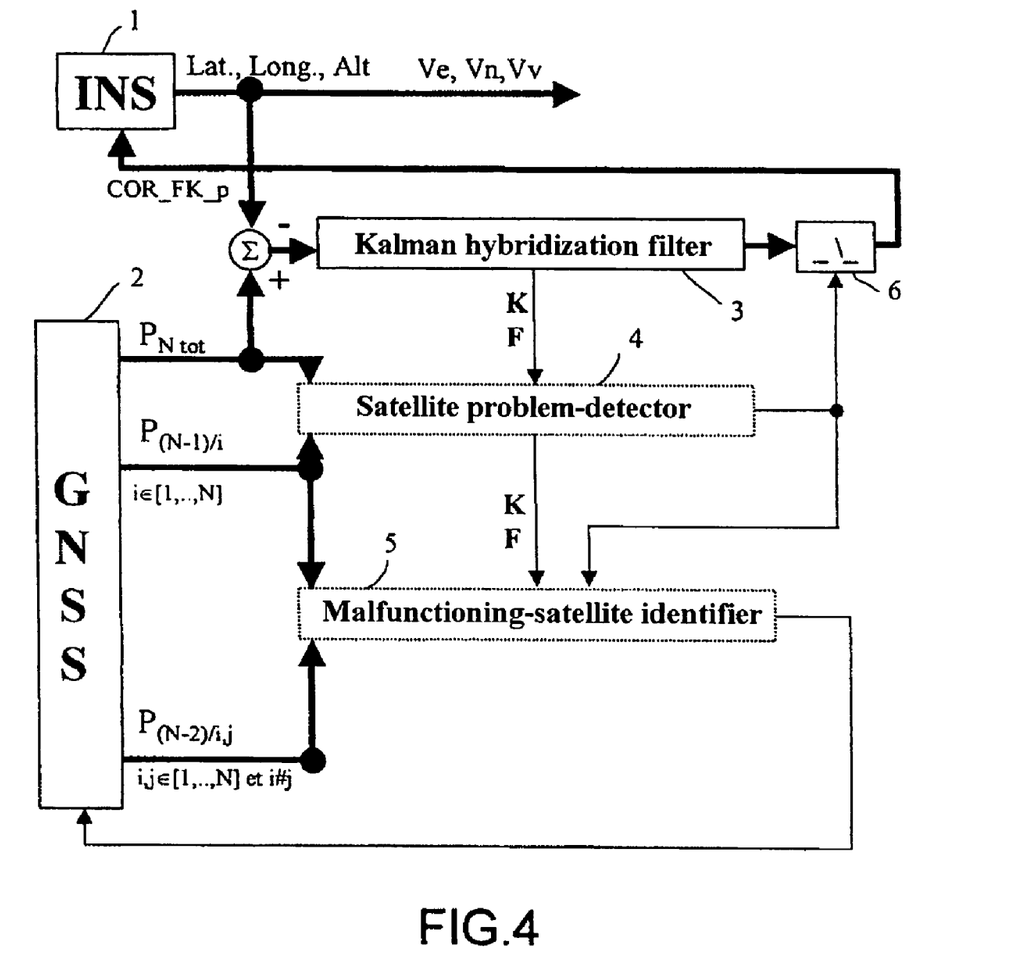
FIG. 4 represents a hybrid INS/GNSS positioning system provided with a satellite problem-detector circuit and a faulty-satellite identification circuit compliant with the invention, and FIG. 5 details the constitution of the faulty-satellite identification circuit of FIG. 4.

FIG. 4 gives an exemplary diagram of a closed loop mode INS/GNSS hybrid system equipped with a satellite problem-detector and a malfunctioning-satellite identifier.

As in the case of FIG. 3, there is an inertial unit INS 1, a GNSS receiver 2, a Kalman hybridization filter 3 operating on the residual values of the errors between the position, in the form of geographic coordinates, given by the inertial unit INS 1 and that, also in the form of geographic coordinates, given by the GNSS receiver 2 and providing readjustment information to the inertial unit INS 1, and a satellite problem-detector circuit 4 similar to that of FIG. 3 controlling an inhibition circuit 5 inserted between the output of the Kalman hybridization filter 3 and a readjustment input of the inertial unit INS 1.

In addition to these elements, there appears a malfunctioning-satellite identification circuit 6 operating from different position points, in the form of geographic coordinates, established by the GNSS receiver 2 with all the visible satellites minus one and with all the visible satellites minus two, the two visible satellites that are set aside being different each time. The malfunctioning-satellite identification circuit 6 operates in parallel with the satellite problem-detector circuit 4. It is activated by the circuit 4 if a satellite problem is detected. It identifies the malfunctioning satellite for the GNSS receiver 2 which then no longer takes it into account in establishing the position and speed point that is sent to the Kalman hybridization filter. Once the malfunctioning satellite has been set aside, the satellite identification circuit 6 reenables the inhibition circuit 5 and the virtual platform PDV of the inertial unit INS 1 is once again corrected.

The malfunctioning-satellite identification circuit 6 is based on tests taking as references the different possible position points with N−1 satellites that are compared with position points with N−2 satellites derived from these points with N−1. These tests consist in:

evaluating, for each possible selection of N−1 satellites out of the N observable satellites, the position deviations, in the form of geographic coordinates, observed between the position point established by the GNSS receiver 2 with the set of the N−1 satellites of the selection and the different possible position points with N−2 satellites that the GNSS receiver 2 can establish by setting aside an additional satellite from the selection, submitting these deviations to a bank of predictor/estimator filters to evaluate the error induced jointly by two satellites, comparing the states of this second bank of predictor/estimator filters with the variances that are associated with them, identifying the family of filters not raising their statistical test and deducing from this the malfunctioning satellite, indicating to the GNSS receiver the corrupted satellite to remove it from the set of visible satellites used to resolve the position (and speed) point with N satellites communicated to the Kalman filter, reenabling the corrections supplied by the Kalman filter to the inertial unit once the defective satellite has been removed from the point of the GNSS receiver and the filter has been reconfigured.

In practice, it is only when the faulty satellite is removed from the selection of N−1 satellites and from the resulting selections of N−2 satellites that the statistical tests on the states of the predictor/estimator filters are not triggered (tests not raised).

Figure 5:
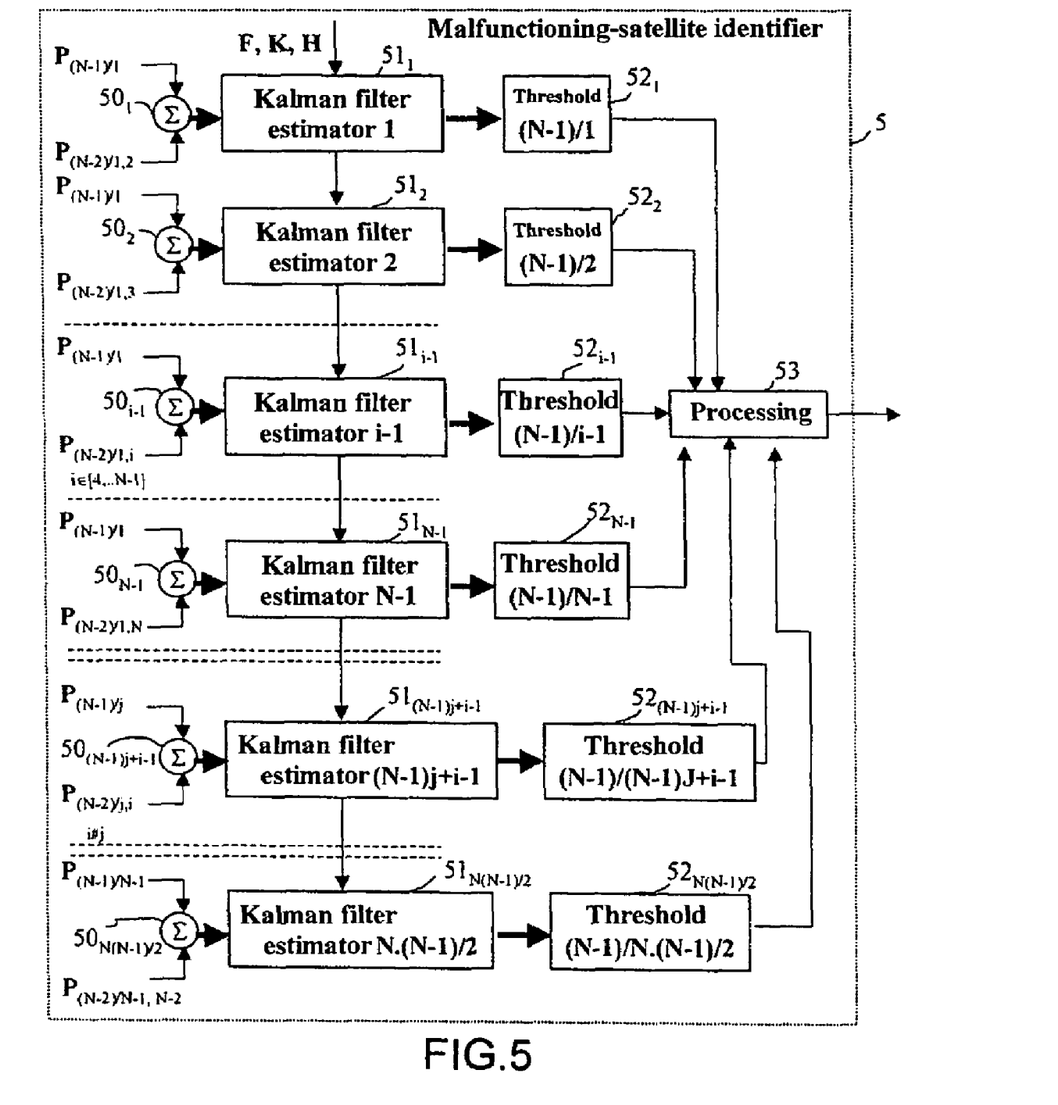

As shown in FIG. 5, the malfunctioning-satellite identification circuit 6 comprises a bank of $N.(N-1)/2$ predictor/estimator filters $61_{i,j}$ ($1 \leq i < j \leq N$, i and j denote the satellites not observed on resolving the point with N−2 supplied to the predictor/estimator filter) processing all the deviation possibilities between a position point, in the form of geographic coordinates, with N−1 visible satellites and a position point, also in the form of geographic coordinates, with N−2 visible satellites, the satellite excluded from the selection with N−1 satellites also being excluded from the selection with N−2 satellites. A test circuit $62_{i,j}$ associated with each predictor/estimator filter $61_{i,j}$ of the bank tests the states modeled in the predictor/estimator filter against their variances. A processing circuit 63 extracts from the tests supplied by the test circuits $62_{i,j}$ the identity of the faulty satellite.

Each of the predictor/estimator filters $61_{i,j}$ of the filter bank dedicated to identification of the malfunctioning satellite has the same configuration as the predictor/estimator filters $40_i$ of the bank of filters dedicated to the detection of malfunctioning of a satellite with the same gain K, evolution F and observation H matrices, and receives, as measurement, the deviation supplied by a subtractor circuit $60_{i,j}$ between the position, in the form of geographic coordinates (latitude, longitude and altitude), resulting from a positioning point $P_{(N-1)/i}$ established by the GNSS satellite positioning receiver 2 taking into account the N visible satellites minus one, the $i^{th}$ and the position in the form of geographic coordinates resulting from a positioning point $P_{(N-2)/i,j}$ established by the GNSS satellite positioning receiver 2 by setting aside the information from the satellite already excluded, the $i^{th}$ and one other, the $j^{th}$.

The computations of the associated variances necessary to the test circuits $62_{i,j}$ for comparing the states with their variances are exactly the same as those described for the test circuits $41_i$ associated with the predictor/estimator filters $40_i$ of the first bank and will not be described again here. Only the observation is different since in this case it is a matter of difference between points resolved with (N−1) visible satellites and points resolved with (N−2) visible satellites.

The processing circuit 63 compares the tests of the N different families, in which the $i^{th}$ satellite has been removed for resolution of the position point with N−1 and of the position points with N−2 satellites ($1 \leq i \leq N$), then identifies the defective satellite from the fact that only the predictor/estimator filters of one family, that never taking into account the defective satellite, has no statistical test raised. In practice, besides the other families of predictor/estimator filters comparing the position points with N−1 where the malfunctioning satellite is present with position points with N−2 satellites have at least one statistical test raised. This processing circuit 63 makes it possible to avoid the use of the corrupted satellite in resolving the GNSS point supplied to the hybrid system.

To help with understanding, the functions performed in a device for monitoring the integrity of an INS/GNSS hybrid system have been illustrated in the form of separate blocks, but obviously they can be provided by one and the same programmed logic computer, for example the flight control computer if the bearer of the hybrid positioning system is an aircraft.

The invention claimed is:

1. A device for monitoring the integrity of a hybrid system comprising an inertial unit INS, a GNSS satellite positioning receiver operating on the basis of a constellation of N visible satellites, and a Kalman hybridization filter having a state vector corresponding to the errors of the hybrid system, in particular the bias and residual drift errors of the inertial unit INS (1), observing the deviations between the positioning and speed points supplied, in the form of geographic coordinates, by the inertial unit INS and by the GNSS receiver, having an evolution matrix F modeling the trend of the errors of the hybrid system, an observation matrix H modeling the relationships between the state vector and the deviations observed between the positions and speeds delivered by the inertial unit INS and the GNSS receiver, and a gain K minimizing the covariance of the error made on the a posteriori estimation of the state vector of the Kalman filter and in particular of the residual errors of the inertial unit INS, and delivering an a posteriori estimate of the errors of the hybrid system used to reset the inertial unit INS, wherein the GNSS receiver delivers, in addition to a position point obtained from the N visible satellites that it has in view, position points $P_{(N-1)/i}$, $i \in [1, \ldots N]$ etc., resolved with N−1 visible satellites deducted from the constellation of the N visible satellites by depriving it each time of a different satellite and in that it comprises a satellite problem-detector circuit comprising:

a bank of N predictor/estimator filters ($40_i$) of the error induced by the satellite that was removed on resolving a position point with N−1 satellites, having the gain K and the evolution matrix F of the Kalman hybridization filter, each filter observing the deviation between the position point, in the form of geographic coordinates, delivered by the GNSS receiver by observing the N visible satellites and one of the position points $P_{(N-1)/i}$, also in the form of geographic coordinates, delivered by the GNSS receiver by observing N−1 visible satellites and test circuits ($41_i$) comparing the states of the predictor/estimator filters ($40_i$) with their variances and detecting a satellite failure when the test is positive, the deviation found being greater than a detection threshold.

2. The device as claimed in claim 1, wherein the detection thresholds are statistical thresholds that take account of the covariance associated with the type of positioning error concerned.

3. The device as claimed in claim 1, wherein the detection thresholds are statistical thresholds that take account of the covariance associated with the type of positioning error concerned and that are a function of the acceptable false alarm ratio for the test.

4. The device as claimed in claim 1, comprising: a reset inhibition circuit inserted between the output of the Kalman hybridization filter and a reset input of the inertial unit INS, and activated by the satellite problem-detector circuit.

5. The device as claimed in claim 1, wherein the predictor/estimator filters ($40_i$) of the satellite problem-detector circuit all have the same observation matrix.

6. The device as claimed in claim 1, wherein the GNSS receiver delivers position points $P_{(N-1)/i}$ $i \in [1, \ldots N]$ and $P_{(N-2)/i,j}$ ($1 \leq i \leq j \leq N$), in the form of geographic coordinates, resolved from N−1 and N−2 satellites deducted from the N visible satellites by each time removing a different visible satellite, the $i^{th}$ for the point $P_{(N-1)/i}$, and by also removing another satellite from the remaining N−1, the $j^{th}$ for the point $P_{(N-2)/i,j}$, and in that it comprises a malfunctioning-satellite identification circuit comprising:

a bank of N×(N−1)/2 predictor/estimator filters ($61_{i,j}$) estimating the error induced jointly by two satellites out of the N observable satellites having the gain K and the evolution matrix F of the Kalman hybridization filter, each filter observing the deviation between a position point ($P_{(N-1)/i}$), in the form of geographic coordinates, delivered by the GNSS receiver from a specific constellation of N−1 visible satellites and one of the position points $P_{(N-2)/i,j}$ delivered by the GNSS receiver from a constellation of (N−2) visible satellites deducted from the specific constellation of (N−1) visible satellites deprived of one of its satellites, the $j^{th}$ the predictor/estimator filters being able to be grouped in families of N−2 elements according to the specific constellation of N−1 satellites taken into account, a bank of test circuits ($62_{i,j}$) comparing the states of the predictor/estimator filters ($61_{i,j}$) with their variances and detecting an anomaly if the deviation found is greater than a detection threshold, and a circuit for processing the results of the tests centralizing the tests raised identifying, if anomalies are detected, a faulty satellite as being the satellite excluded from a position point resolved with N−1 satellites for which the family of predictor/estimator filters is the only one not to have any of its elements detecting an anomaly.

7. The device as claimed in claim 6, wherein the detection thresholds of the test circuits ($62_{i,j}$) of the circuit identifying malfunctioning satellites are statistical thresholds taking account of the covariance associated with the type of positioning error concerned.

8. The device as claimed in claim 7, wherein the detection thresholds of the test circuits ($62_{i,j}$) of the circuit identifying malfunctioning satellites are statistical thresholds that take account of the covariance associated with the type of positioning error concerned and that are a function of the acceptable false alarm ratio for the test.

9. The device as claimed in claim 6, wherein the predictor/estimator filters ($61_{i,j}$) of the malfunctioning-satellite identification circuit all have the same observation matrix.

10. The device as claimed in claim 6, wherein the predictor/estimator filters ($40_i$, $61_{i,j}$) of the satellite problem-detector circuit and of the malfunctioning-satellite identification circuit all have the same observation matrix.

* * * * *